(12) United States Patent
Langille (10) Patent No.: US 9,630,291 B2
(45) Date of Patent: Apr. 25, 2017

(54) TOOL AND METHOD FOR REPAIRING TUBULAR MEMBERS

(71) Applicant: Randy Charles Langille, Port Alberni (CA)

(72) Inventor: Randy Charles Langille, Port Alberni (CA)

( * ) Notice: Subject to any disclaimer, the term of this patent is extended or adjusted under 35 U.S.C. 154(b) by 154 days.

(21) Appl. No.: 14/385,085

(22) PCT Filed: Mar. 11, 2013

(86) PCT No.: PCT/CA2013/000219
§ 371 (c)(1),
(2) Date: Sep. 12, 2014

(87) PCT Pub. No.: WO2013/134855
PCT Pub. Date: Sep. 19, 2013

(65) Prior Publication Data
US 2015/0033530 A1    Feb. 5, 2015

Related U.S. Application Data

(60) Provisional application No. 61/610,751, filed on Mar. 14, 2012.

(51) Int. Cl.
*B29C 73/26* (2006.01)
*B24B 19/02* (2006.01)
(Continued)

(52) U.S. Cl.
CPC .............. *B24B 19/02* (2013.01); *A63B 59/70* (2015.10); *B24B 5/40* (2013.01); *B29C 73/02* (2013.01);
(Continued)

(58) Field of Classification Search
CPC .... F02C 7/06; F01D 25/164; Y10T 29/49679; Y10T 29/49689; Y10T 29/49682; Y10T 29/49696; Y10T 29/49636; Y02T 50/672; F05D 2240/54; F05D 2220/323; F05D 2230/10; F05D 2260/96
See application file for complete search history.

(56) References Cited

U.S. PATENT DOCUMENTS 5,312,100 A * 5/1994 Ilacqua .................. A63B 59/70
473/562
5,607,154 A * 3/1997 Meumann .............. A63B 53/02
16/108
(Continued)

FOREIGN PATENT DOCUMENTS

CA    2443121    3/2004
CA    2561446    10/2005

*Primary Examiner* — Richard Chang
(74) *Attorney, Agent, or Firm* — Janeway Patent Law PLLC (57) ABSTRACT

A rotatable tool for use in repairing composite hollow shafts, namely for sports equipment, for example, composite hockey stick shafts. The rotatable tool includes a plurality of aligned spaced-apart grinding surfaces and proximal and distal guide bearings coaxially arranged along a tool shaft. The rotatable tool is used to form grooves proximate the repair location so as to enhance mechanical bonding of a composite repair material which spans a region of abutment of hollow shaft segments.

10 Claims, 9 Drawing Sheets

(51) Int. Cl.
*B29C 73/02* (2006.01)
*B24B 5/40* (2006.01)
*A63B 59/70* (2015.01)
*B29L 31/52* (2006.01)
*A63B 102/24* (2015.01)
*A63B 59/20* (2015.01)
*A63B 102/22* (2015.01)

(52) U.S. Cl.
CPC ............. *B29C 73/26* (2013.01); *A63B 59/20* (2015.10); *A63B 2102/22* (2015.10); *A63B 2102/24* (2015.10); *B29C 2073/264* (2013.01); *B29L 2031/52* (2013.01); *Y10T 29/49746* (2015.01)

(56) References Cited

U.S. PATENT DOCUMENTS

| | | | |
|---|---|---|---|
| 6,241,633 B1 | 6/2001 | Conroy | |
| 6,998,576 B2 * | 2/2006 | Marquis | A01K 87/085 219/204 |
| 7,108,618 B2 | 9/2006 | Frischmon et al. | |
| 7,232,386 B2 * | 6/2007 | Halko | A63B 59/70 473/561 |
| 8,586,177 B2 * | 11/2013 | Wilbur | B29C 73/04 428/304.4 |

\* cited by examiner

Fig 2

TOOL AND METHOD FOR REPAIRING TUBULAR MEMBERS

FIELD OF THE INVENTION

The present invention relates to a tool and method for repairing a broken tubular member, preferably a prismatic tubular members (i.e., having three or more longitudinally extending corners), for example shafts of sporting equipment, such as hockey sticks, lacrosse sticks etc.

BACKGROUND OF THE INVENTION

Tubular members for a variety of uses (e.g. conduits, shafts for sporting equipment etc.) are often made from composite materials.

For example, over the years, advancements in material technology have led to increased sophistication in the manufacturing and performance of hockey sticks. Traditionally, hockey sticks were manufactured primarily of wood with a fiberglass covering on the blade portion. The wood stick comprised a solid shaft, either a single piece of wood or a sandwich of multiple layers of wood. Solid shafts are typically very durable but suffer somewhat from relatively high weight and limited flexibility.

Through the use of advanced material technologies, modern hockey sticks are often manufactured using a wide variety of materials. In addition to the aforementioned wood and fiberglass, newer materials including lightweight metals, such as aluminum, and high performance polymers and composite materials. For example Kevlar, RTM (resin transfer moldings), graphite, ABS (acrylonitrile butadiene styrene), carbon fiber and ceramics are being used either individually or in combination.

Using these new materials, manufacturers of hockey sticks, have been able to alter hockey stick performance to adjust and tune stick characteristics such as weight and stick flex.

One way in which these new materials have affected stick construction is through the development of hockey sticks having hollow shafts. U.S. Pat. No. 6,241,633; Hockey Stick Shaft and Method of Making Same; Conroy; issued 5 Jun. 2001, is an example of a method for making such a hockey stick.

Hockey sticks with hollow shafts can be manufactured of any of the aforementioned materials and can be either one-piece designs, or they can include removable/replaceable blades and shaft extensions to vary the overall stick length.

One drawback with hollow shafts is that the shafts are more likely to break in use, as compared to hockey sticks with conventional solid shafts (for which the blade was more likely to break than the shaft). As hollow shafts and modern stick designs often have a significant replacement cost, shaft breakage can lead to significant warranty and service issues for suppliers, as well as frustration on the part of consumers.

Examples of apparatus and methods for repairing hockey stick shafts are described in: U.S. Pat. No. 7,108,618, Apparatus and Method for Repairing a Hockey Stick Shaft, Frischmon et al., issued: 19 Sep. 2006; and Canadian Patent No. 2,561,446, Support System For A Single- Or Multi-Piece Hollow Object.

SUMMARY OF THE INVENTION

In one aspect, the present invention provides a rotatable tool for use with a rotary driver in repairing a break in a longitudinally extending tubular member, the tool including: a mounting section for engagement with a rotary driver; a plurality of aligned spaced-apart grinding surfaces; a proximal bearing for abutting an inner wall of a tubular member during use; and a distal bearing for abutting the inner wall of the tubular member during use; wherein, in use each grinding surface forms a groove in the inner wall of the tubular member, each such groove extending laterally to the longitudinal extent of the tubular member.

The diameter of the proximal bearing is preferably less than the diameter of the distal bearing, such that a groove formed by one of the grinding surfaces proximate the proximal bearing has a greater depth than a groove formed by one of the grinding surfaces proximate the distal bearing.

The proximal bearing may be adjacent the mounting section, the distal bearing may be at the end of the tool opposite the mounting section, and the grinding surfaces may be between the proximal bearing and the distal bearing.

The tubular member may be a composite hockey stick shaft. The mounting section may be a shank with a diameter of about ¼"; the spaces between the spaced-apart grinding surfaces may define annular recesses each having a diameter of about ¼"; the diameter of the proximal bearing may be about 5/16", the diameter of the distal bearing may about ⅜"; and the diameter of the grinding surfaces may be about ⅜". The tool may be longitudinally extending and the length of each of the grinding surfaces and annular recesses along the longitudinal extent of the tool may be about ⅛".

The tool may be longitudinally extending and the length, along the longitudinal extent of the tool, of one of the grinding surfaces may be different from another of the grinding surfaces. The tool may be longitudinally extending and the length, along the longitudinal extent of the tool, of the annular recesses may be different from the grinding surfaces.

In another aspect, the present invention provides for the use of the tool in the repair of a composite sport shaft. The shaft may be a hockey stick shaft.

In another aspect, the present invention provides a method for repairing a break in a longitudinally extending composite sport shaft, the method including: forming grooves on the inner walls of a first shaft segment and a second shaft segment proximate the break; bringing the first shaft segment and second shaft segment into aligned abutment; and applying a fibre material impregnated with a resin to the inner walls so as to cause the impregnated fibre material to span the abutment between the first shaft segment and second shaft segment, and to intrude into the grooves.

The method may include squaring the first shaft segment and second shaft segment at the break prior to forming the grooves. The grooves may be formed with a rotatable tool engaged with and driven by a rotary driver, wherein the tool includes: a plurality of aligned spaced-apart grinding surfaces; a proximal bearing for abutting an inner wall of a sport shaft during use; and a distal bearing for abutting the inner wall of the sport shaft during use.

The grooves preferably extend laterally relative to the longitudinal extent of the shaft.

The sport shaft may be a hockey stick shaft.

Applying the impregnated fibre material may include pressing the impregnated fibre material against the inner walls using a reversibly expansible member.

DETAILED DESCRIPTION WITH REFERENCE TO THE DRAWINGS

Groove former embodiments of the present invention and a method embodiment of the present invention for use in repairing hollow composite shafts of hockey sticks are described in what follows and shown in the drawings.

Figure 1:
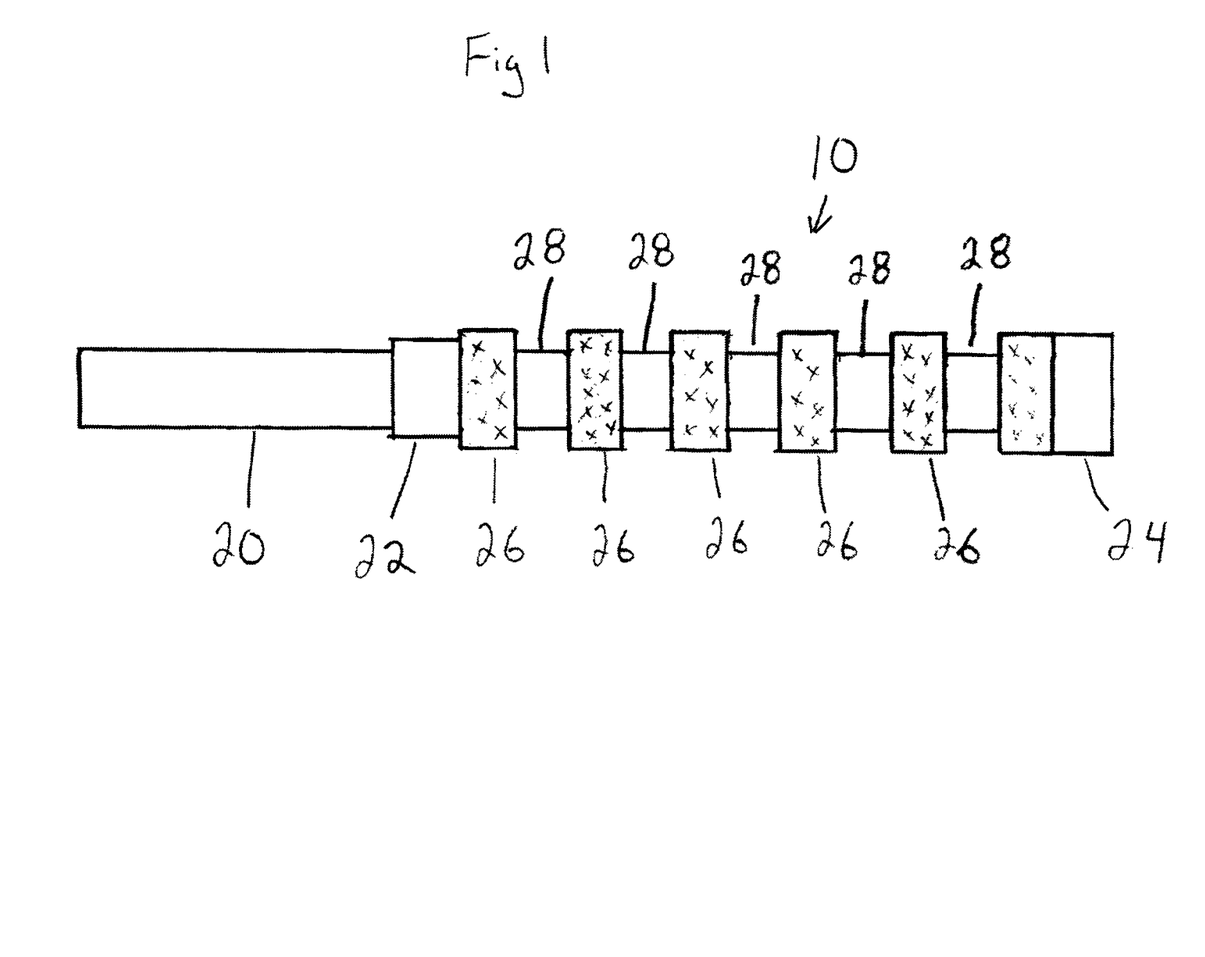
FIG. 1 is a plan view of a groove former embodiment of the present invention having essentially equally sized annular grinding surfaces and spaces therebetween

A groover former 10 is shown in FIG. 1. The groove former 10 includes a shank 20, a proximal bearing 22, a distal bearing 24, six grinding surfaces 26 and five annular recesses 28, being an annular recess 28 between each adjacent pair of grinding surfaces 26.

For use in the repair of hockey sticks, the diameter of the shank 20 is preferably ¼", the diameter of the proximal bearing 22 is preferably 5/16", the diameter of the distal bearing 24 is preferably ⅜", and the diameter of the grinding surfaces 26 is preferably ⅜". The diameter of the annular recesses must be less than the diameter of the grinding surfaces 26 while being sufficient for structural integrity. It has been found that with a shank 20 having a diameter of ¼", annular recesses having a diameter of ¼" are suitable.

In the groove former 10 shown in FIG. 1, the longitudinal extent (i.e., longitudinal with respect to the length of the groove former) of the grinding surfaces 26 and the annular recesses 28 are roughly equal. It has been found that a longitudinal extent for each of the grinding surfaces 26 and annular recesses 28, of ⅛" is suitable.

Figure 2:
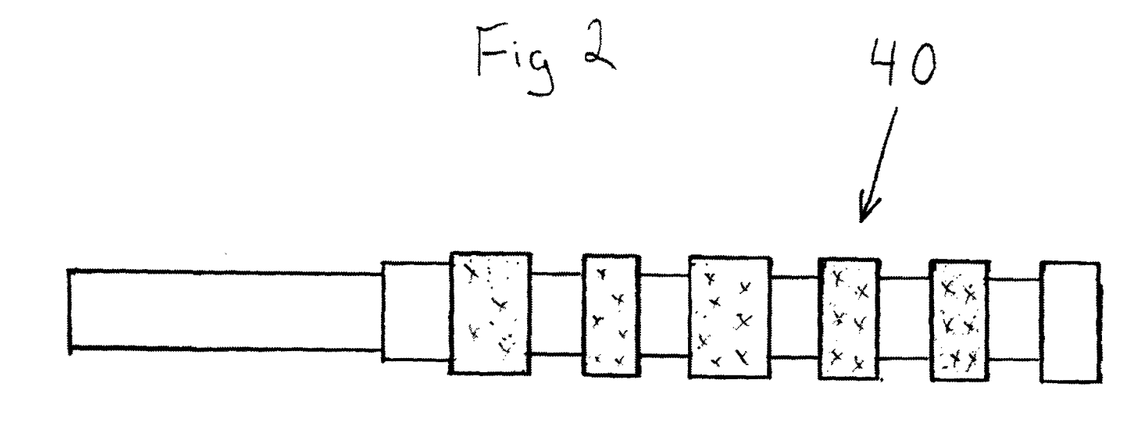
FIG. 2 is a plan view of a groove former embodiment of the present invention having differently sized annular grinding surfaces and essentially equal spaces therebetween
Figure 3:
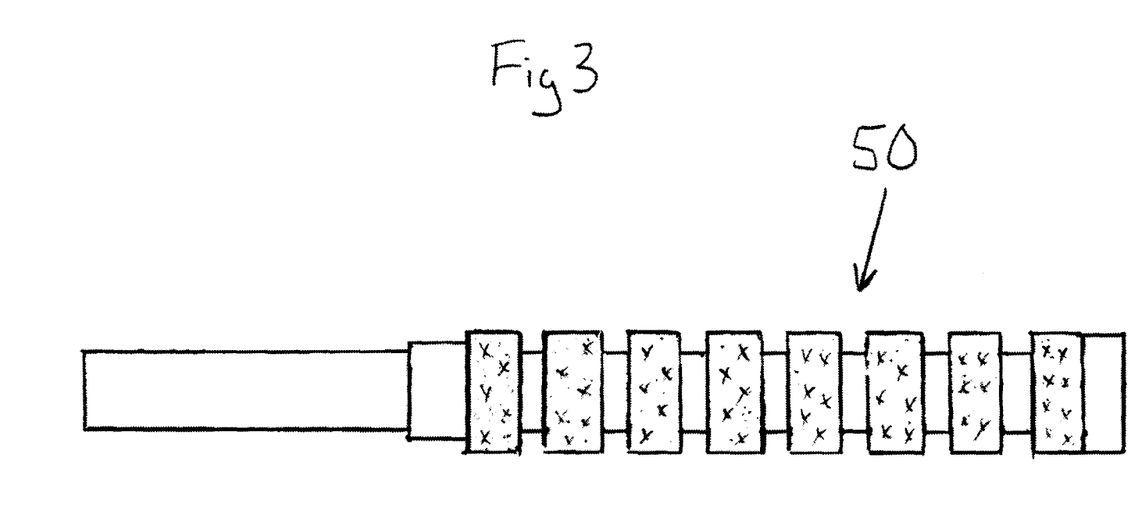
FIG. 3 is a plan view of a groove former embodiment of the present invention having essentially equally sized annular grinding surfaces and essentially equal spaces therebetween, with the size of the spaces being less than the size of the grinding surfaces.

As indicated in FIGS. 2 and 3, the longitudinal extent of the grinding surfaces 26 and the annular recesses 28 need not be roughly equal. FIG. 2 shows a variable-size groove former 40 in which the longitudinal extent of the grinding surfaces 26 is not the same. FIG. 3 shows a small-space groove former 50 in which the longitudinal extent of the grinding surfaces 26 is larger than the longitudinal extent of the annular recesses 28.

Figure 4:
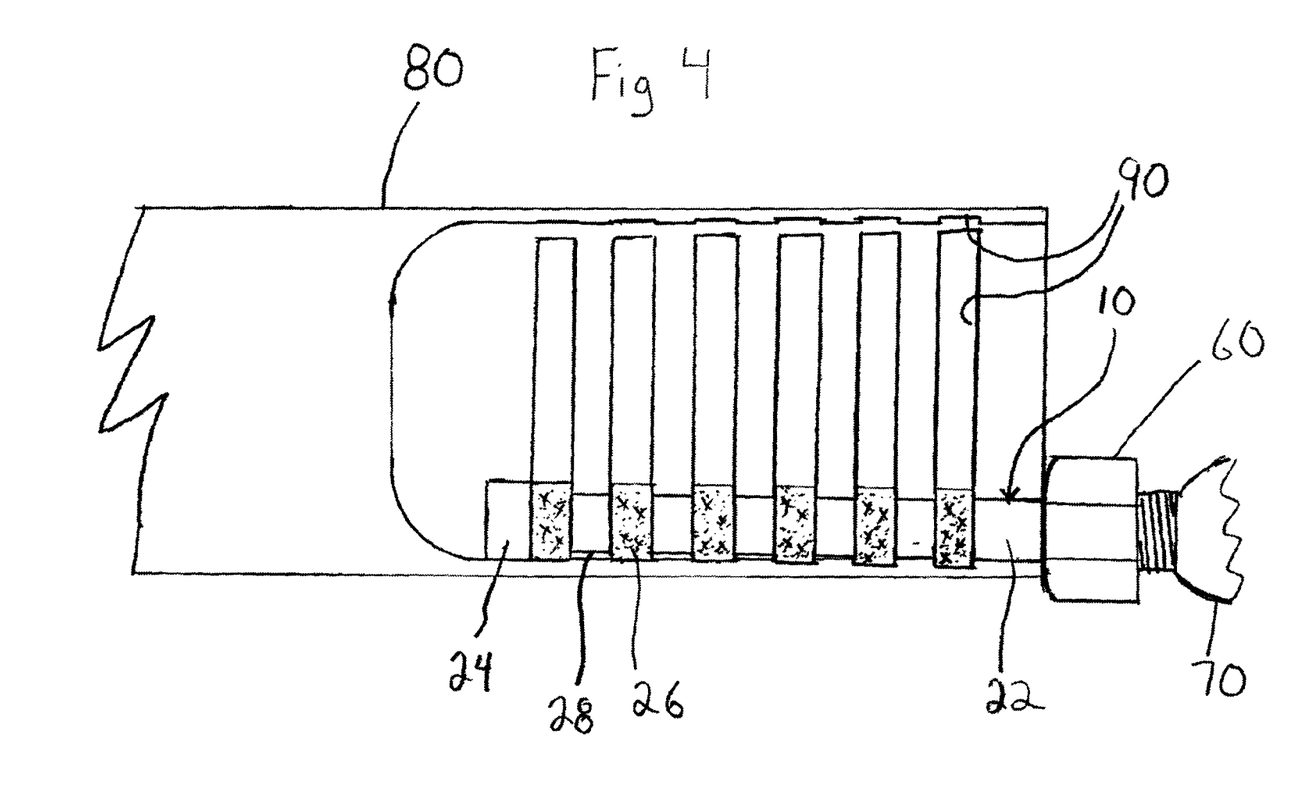
FIG. 4 is a cutaway view, showing the groove former embodiment shown in FIG. 1 in use in a hockey stick shaft segment and showing the depths of the interior grooves formed thereby.

As shown in FIG. 4, in use the groove former 10 is supported by a chuck 60 having a chuck bearing surface 62, and attached to, and driven by, a rotary power tool 70.

The chuck 60 is preferably a collet, being a device that forms a collar around the object to be held and exerts a strong clamping force on the object when it is tightened, usually via a tapered outer collar, that may be used to hold a workpiece or a tool.

As shown in FIG. 4, in use, with the chuck bearing surface 62 abutting the relevant end of the hockey stick shaft 80, the groove former 10 is rotated using the rotary power tool 70 and moved circumferentially against the inner walls of the hockey stick shaft so as to form parallel grooves 90. As shown in FIG. 4, the difference in diameter as between the proximal bearing 22 and the distal bearing 24 results in a regular reduction in depth of the grooves 90 moving from the proximal bearing 22 to the distal bearing 24. Abutting the chuck bearing surface 62 against the relevant end of the hockey stick shaft 80 during the groove forming operation produces grooves 90 that are parallel to the end of the hockey stick shaft 80.

Figure 5:
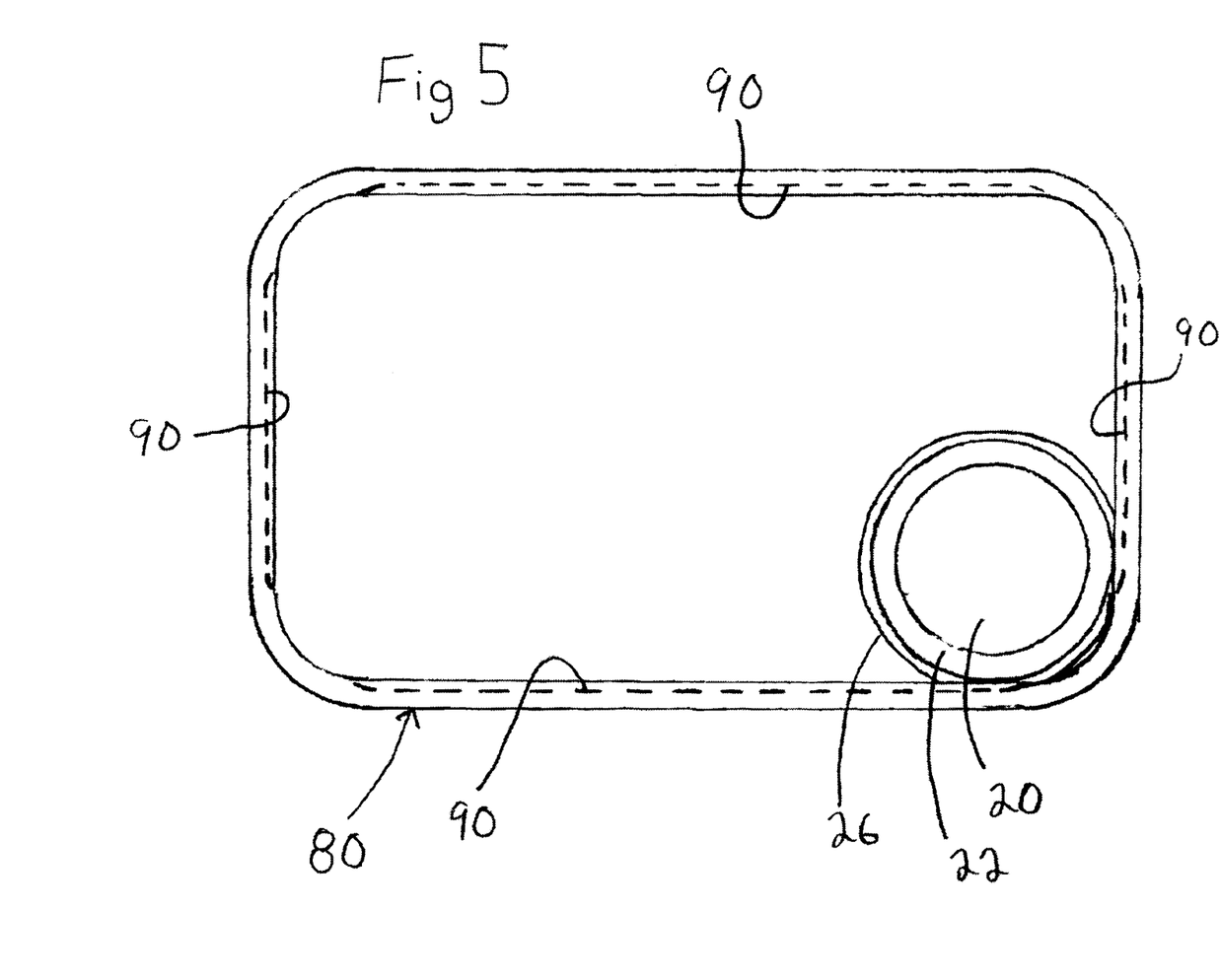
FIG. 5 is a partially transparent view showing the lateral extent (lateral with respect to the longitudinal axis of the shaft) of interior grooves formed by a groove former embodiment of the present invention.

As shown in FIG. 5, with a hockey stick shaft 80 of conventional size shape and wall thickness, the preferred component diameters given above prevent the grooves 90 from extending into, and undesirably weakening, the corners of the hockey stick shaft 80.

Groove formers of the sort described above may be manufactured from carbide grinding bits having the desired grinding surface diameter, by machining away bit material to form the annular recesses and seats for the proximal and distal bearings, and then pressing on the proximal and distal bearings Although, rotating bearings could be used, annular rings of solid metal have been found to be suitable for the proximal and distal bearings.

Figure 6:
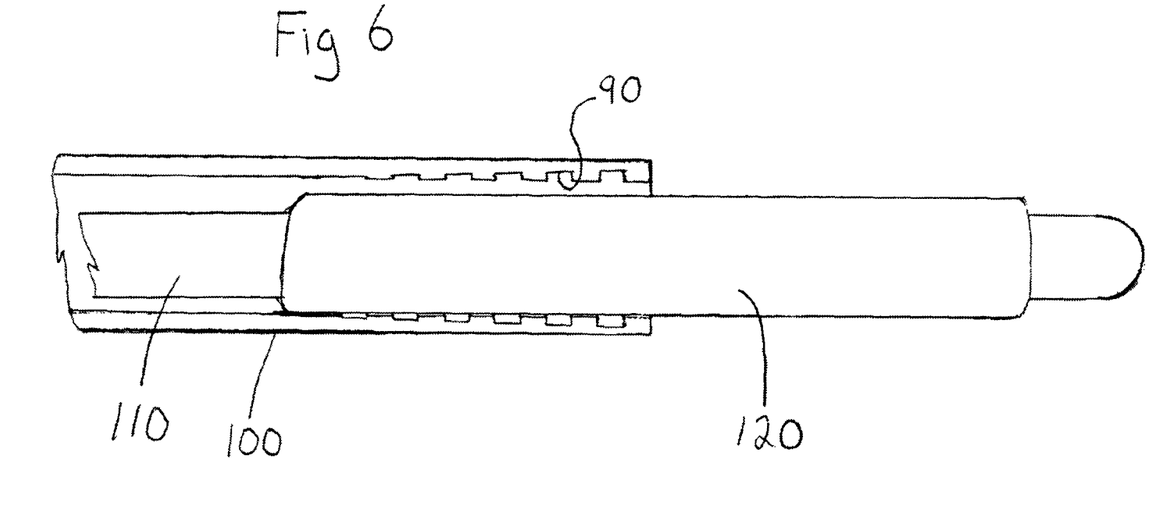
FIG. 6 is a stylized partially transparent view showing the positioning of an expansible member and uncured repair material with respect to a first shaft segment.
Figure 7:
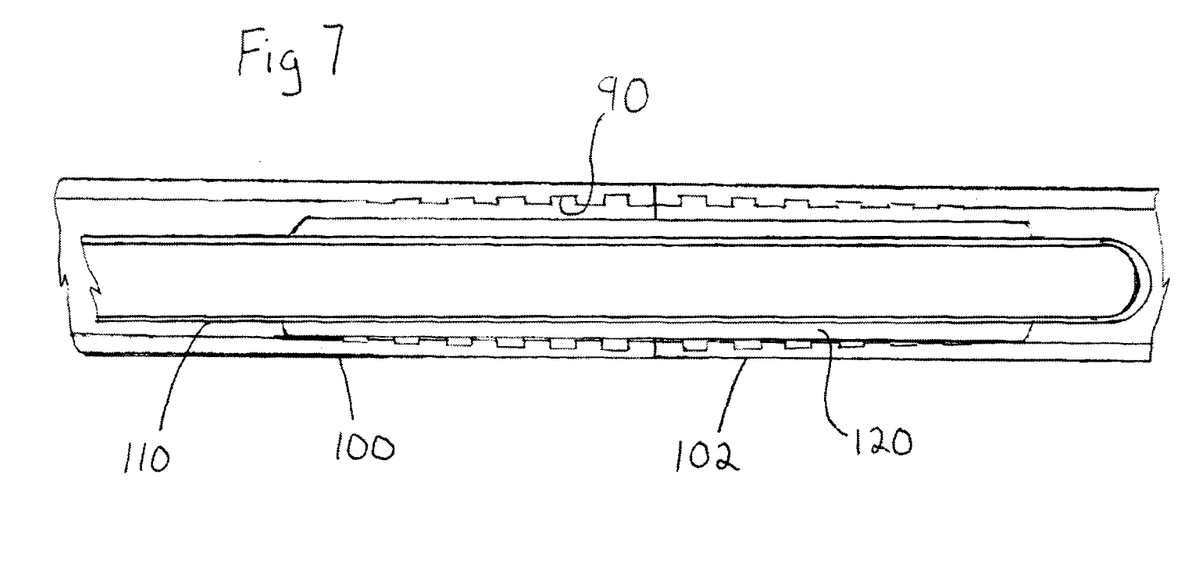
FIG. 7 is a stylized partially transparent view showing the positioning of an expansible member and uncured repair material with respect to a first shaft segment and second shaft segment in aligned abutment.
Figure 8:
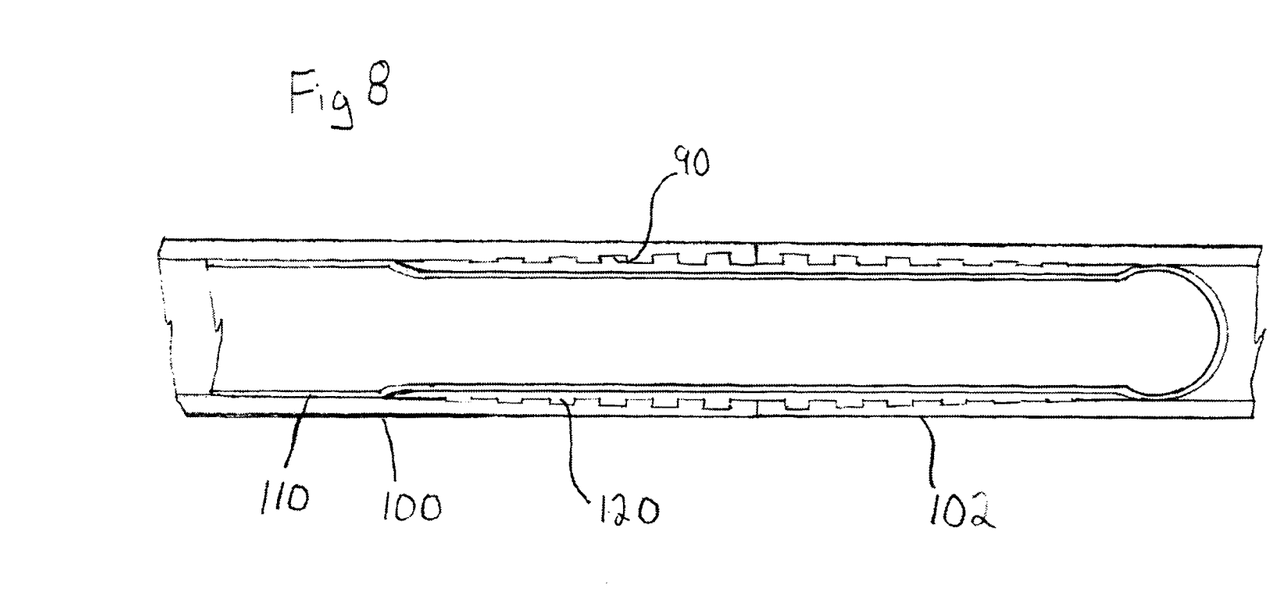
FIG. 8 is a stylized partially transparent view showing the positioning of an expansible member and uncured repair material with respect to a first shaft segment and second shaft segment in aligned abutment, with the expansible member expanded.
Figure 9:
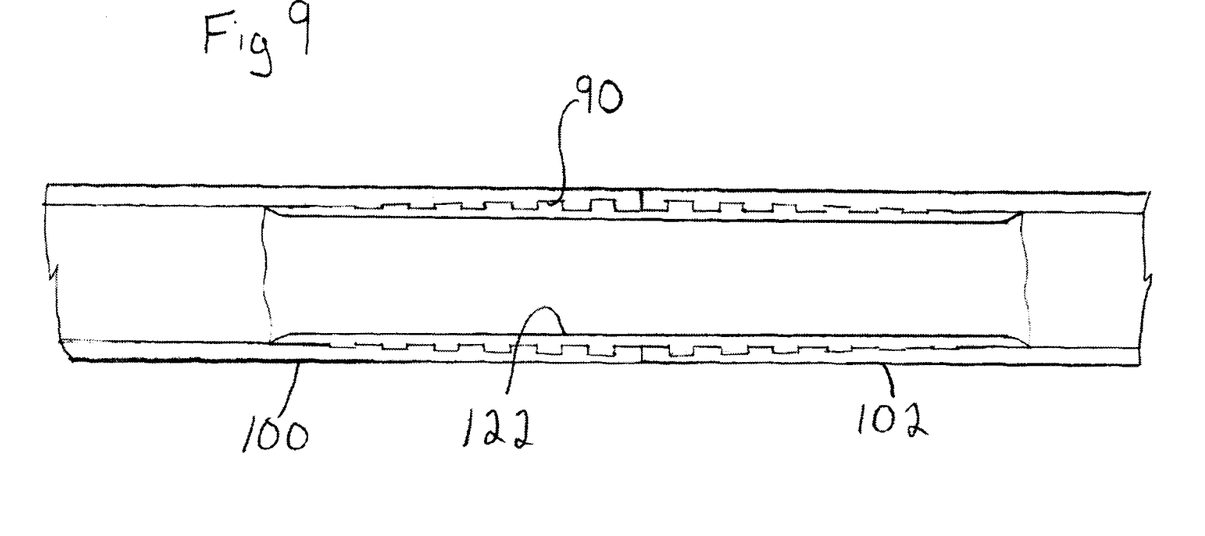
FIG. 9 is a stylized partially transparent view showing a self-supporting repair in a first shaft segment and second shaft segment.

The method of repair includes the step of removing extraneous damaged (e.g., delaminated) material at the site of the break and squaring the ends of the first shaft segment 100 and second shaft segment 102. A groove former 10 is used to form grooves 90 in the first shaft segment 100 and second shaft segment 102 as described above. A reversibly expansible member 110 (for example, an inflatable bladder) supporting an uncured composite repair material 120 (i.e., a fibre material impregnated with an uncured resin) is positioned in the first shaft segment 100 with the wet composite material 120 roughly centered on the squared end of the first shaft segment 100 (FIG. 6). The second shaft segment 102 is brought into aligned abutment with the first shaft segment 100 such that roughly equal portions of the wet composite material 120 are within each of the first shaft segment 100 and second shaft segment 102 (FIG. 7). The reversibly expansible member 110 is expanded so as to press the wet composite material 120 against the inner walls of the the first shaft segment 100 and second shaft segment 102 and thus into the grooves 90 (FIG. 8). Once the uncured composite repair material 120 has at least cured sufficiently to be a self-supporting repair 122, the expansion of the reversibly expansible member 110 is reversed and the reversibly expansible member 110 is withdrawn (FIG. 9).

It has been found that the method and tool described herein produce a good bond strongly resistant to tensile and compressive stresses at the joint face, while not detectably weakening the hockey stick shaft 80, presumably due to the regular reduction in depth of the grooves 90 and the preservation of the full wall thickness at the corners of the hockey stick shaft 80.

Alternative tools could provide the tapering of the depth of the grooves 90; for example, a tool having grinding surfaces of different diameters. Further, differently shaped grinding surfaces could provide grooves of different shapes. However, it is understood that tools configured as described herein are simple and robust, and presumably would be cheaper to manufacture than alternative tools.

What is claimed is:

1. A method for repairing a break at a break location in a composite tubular sport shaft having a longitudinal extent and inner walls, the method comprising:
    forming a first set of grooves on the inner walls of a first shaft segment proximate the break location;
    forming a second set of grooves on the inner walls of a second shaft segment proximate the break location;
    wherein:
        each groove in the first set of grooves and the second set of grooves extends laterally relative to the longitudinal extent of the shaft;
        in each of the first set of grooves and the second set of grooves, one of the grooves of the set of grooves is closest to the break location and another of the grooves of the set of grooves is farther from the break location; and
        in at least one of the sets of grooves, the groove closest to the break location has a greater depth than the groove farther from the break location;
    bringing the first shaft segment and second shaft segment into alignment; and
    applying a fiber material impregnated with a resin to the inner walls so as to cause the impregnated fiber material to span the sets of grooves and to intrude into the grooves.

2. The method of claim 1, further comprising squaring the first shaft segment and second shaft segment at the break location prior to forming the grooves.

3. The method of claim 2, wherein the grooves are formed with a rotatable tool engaged with and driven by a rotary driver, wherein the tool comprises: a plurality of aligned spaced-apart grinding surfaces; a proximal bearing for abutting the inner walls of the sport shaft during use; and a distal bearing for abutting the inner walls of the sport shaft during use.

4. The method of claim 3, wherein: the proximal bearing has a proximal bearing diameter, the distal bearing has a distal bearing diameter, and the proximal bearing diameter is less than the distal bearing diameter.

5. The method of claim 4, wherein the proximal bearing is adjacent the rotary driver, the distal bearing is at the end of the tool opposite the rotary driver, and the grinding surfaces are between the proximal bearing and the distal bearing.

6. The method of claim 5, wherein: the spaces between the spaced-apart grinding surfaces define annular recesses each having a diameter of about ¼"; the proximal bearing diameter is about 5/16", the distal bearing diameter is about ⅜"; and the grinding surfaces have a grinding surfaces diameter of about ⅜".

7. The method of claim 6, wherein the tool is longitudinally extending and the length of each of the grinding surfaces and annular recesses along the longitudinal extent of the tool is about ⅛".

8. The method of claim 1, wherein the sport shaft has longitudinally extending inner corners, each inner corner defined by two adjacent inner walls, and for each groove, a minimum groove depth at each inner corner is less than a maximum groove depth in the two adjacent inner walls.

9. The method of claim 8, wherein the sport shaft is a hockey stick shaft having right-angle inner corners and wherein the grooves do not extend into each inner corner.

10. The method of claim 1, wherein applying the impregnated fiber material comprises pressing the impregnated fiber material against the inner walls using a reversibly expansible member.

* * * * *